Patented Dec. 30, 1952

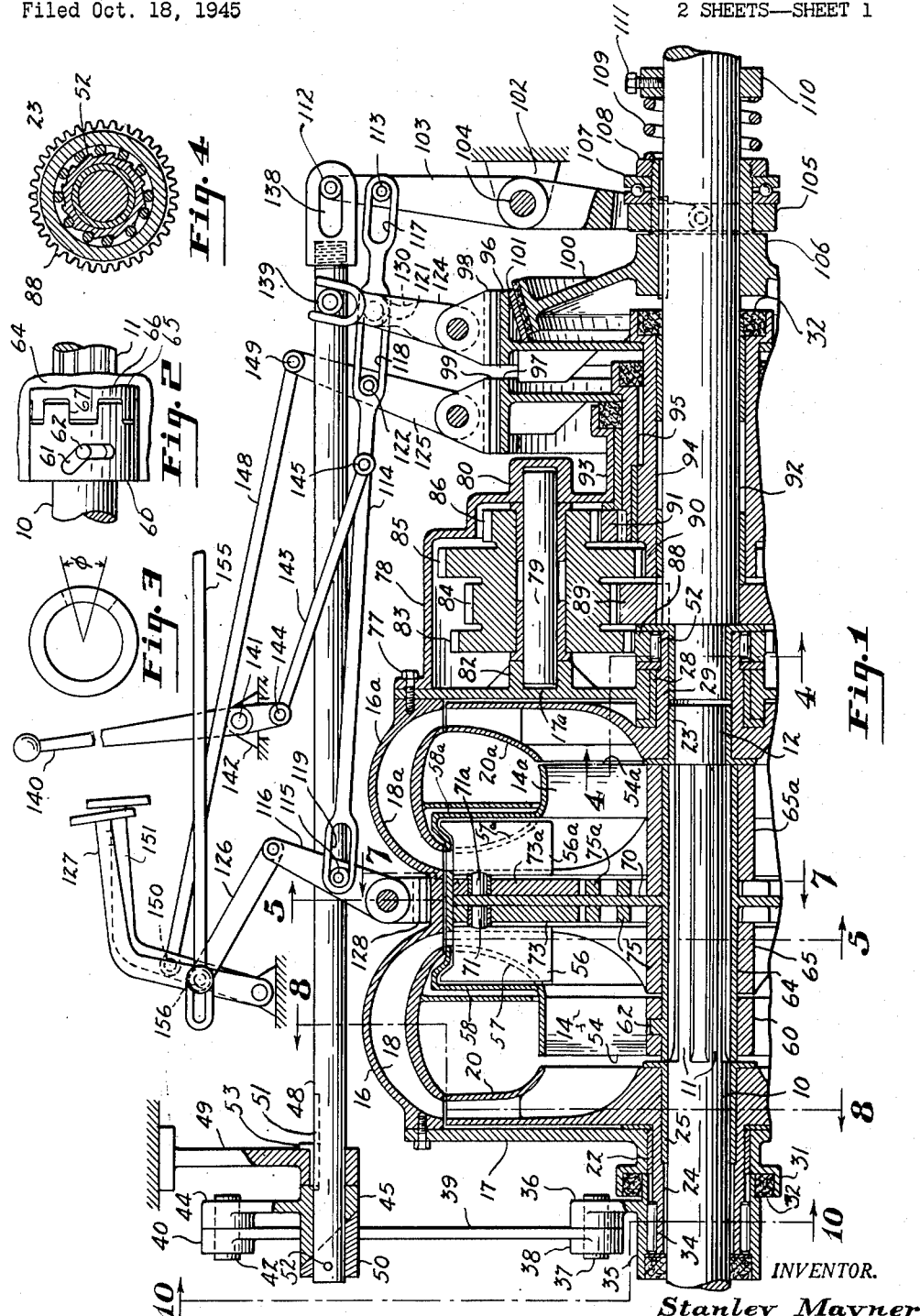

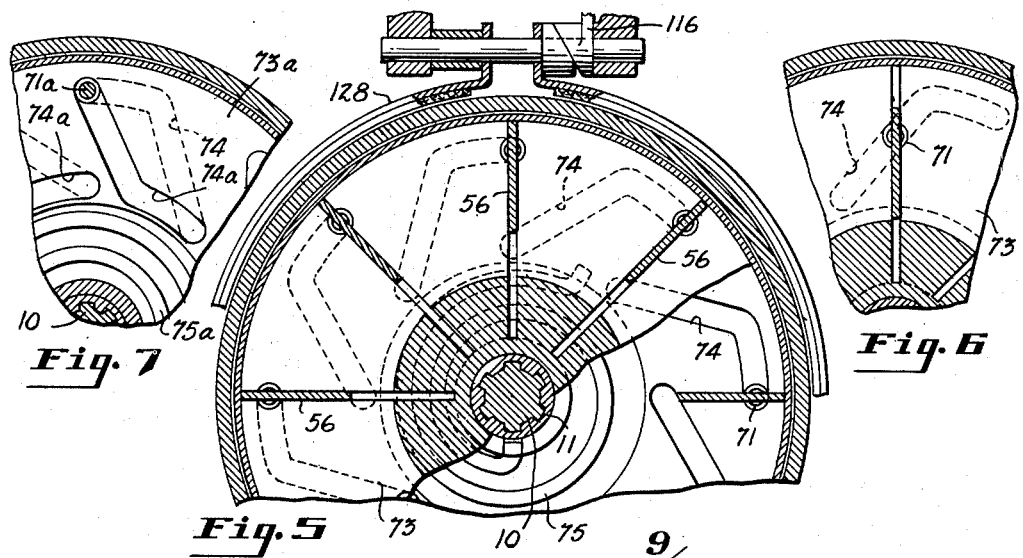
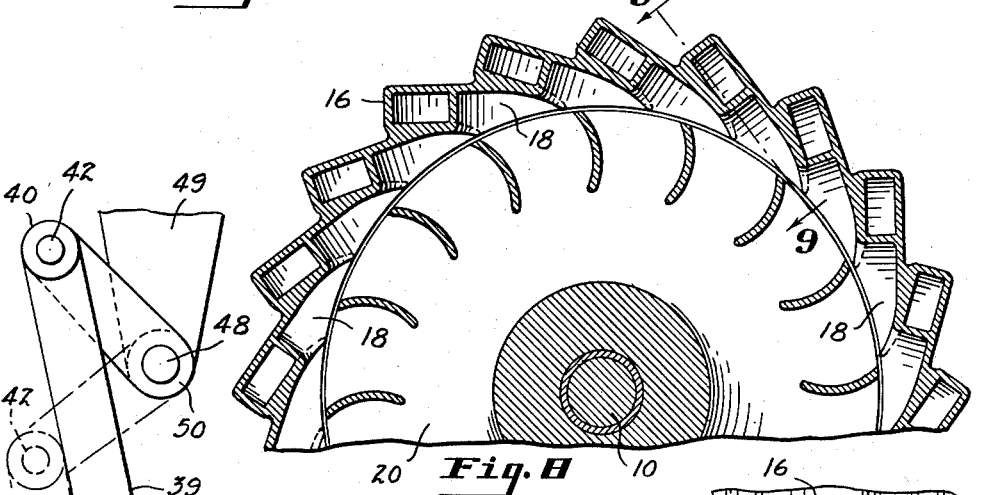
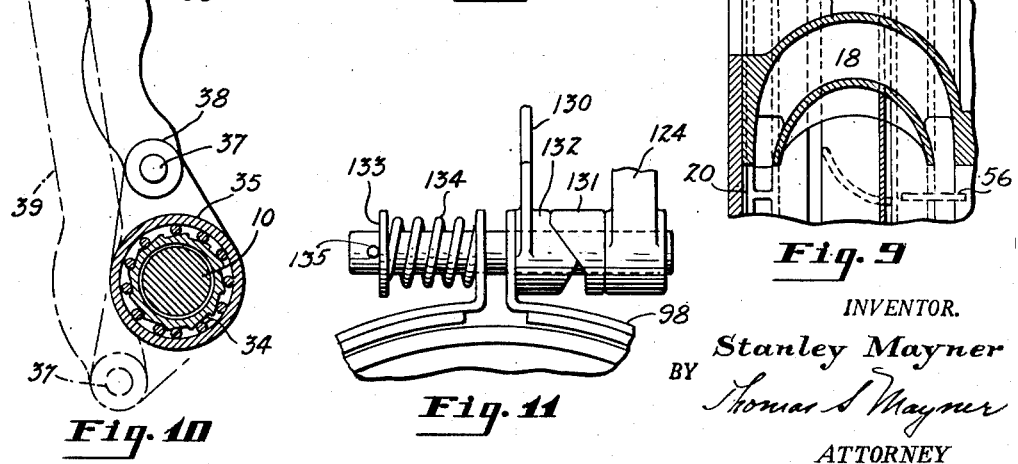

2,623,407

UNITED STATES PATENT OFFICE 2,623,407

FLUID POWER TRANSMISSION

Stanley Mayner, Cleveland Heights, Ohio, assignor of two-fifths to Thomas S. Mayner, Russel Township, Ohio Application October 18, 1945, Serial No. 622,966

21 Claims. (Cl. 74—677)

This invention relates to fluid transmissions, such as fluid torque converters.

The torque converter of the present invention advantageously utilizes the dynamic force of a working fluid. This force is first substantially fully utilized in the torque converter itself, that is, in the fluid working unit, giving a substantial reduction, and then may be further multiplied through an associated mechanical transmission in a manner so as to desirably increase the torque output ratio of the unit. The fluid working portion of the torque converter has an inherent reduction which may in instances be adequate, however, where torque ratios must be high, a transmission means are provided to give substantially increased torque ratios.

In the fluid transmission there is provided an impeller that is adapted to vary the dynamic fluid head in accordance with torque requirements. This advantageous feature permits a substantially greater torque ratio range than otherwise available.

Further, the present invention provides for a substantially smooth and a uniform transition of the unit from a torque converter into a coupling, or vice versa, the transition automatically occurring. There is also provided a reverse drive. Another advantage of the unit is its inherent ability to act as an absorption dynamometer to thereby exert a braking force on a prime mover.

These and other advantages will be apparent from the following description and accompanying drawings, where:

Figure 1 is a substantial sectional elevation of the torque converter of the present invention;

Figure 2 represents a device which permits a limited lateral movement of one of the impeller sections of the converter;

Figure 3 is a diagrammatic representation of the angular movement of the device of Figure 2;

Figure 4 is a section taken across line 4—4 and represents a type of unidirectional clutch utilized;

Figure 5 is a substantial front elevation, in section, of the converter taken across line 5—5;

Figure 6 is a partial section of Figure 5;

Figure 7 is a partial section of the converter taken across line 7—7;

Figure 8 is a partial section of the converter taken across line 8—8;

Figure 9 is a partial section of Figure 8 taken across line 9—9;

Figure 10 represents a type of locking device including a section of a unidirectional clutch taken across line 10—10;

Figure 11 represents another form of locking means utilized in this invention.

Referring to Figure 1 of the drawing, there is shown in substantial section a fluid transmission having an input power shaft 10 a portion of which is splined as at 11, and thereafter terminating in a butt section 12 having a decreased diameter. There is mounted on the splined section 11 a substantially symmetrical impeller 14, 14a having substantially identical blades in two adjoining, separate fluid circuits. The impeller 14, 14a is positioned substantially intermediately within a rotative housing member 16, 16a which also defines a first driven member comprised of a plurality of fluid receiving and reversing buckets 18, 18a (see Figures 8 and 9) which are adapted to receive the working fluid from the impeller 14, 14a and reverse its flow substantially 180°. The driven member 16, 16a is of the type shown and described in the co-pending application, Serial No. 454,639, filed August 13, 1942, and which application has matured into Patent No. 2,432,115.

The buckets 18, 18a comprising the driven housing member 16, 16a and forming the housing periphery are positioned at a desirable fluid receiving angle which is substantially equivalent to the tangential angle of the fluid leaving the impeller blades at starting torques. The driven member 16, 16a, because of the reversing buckets 18, 18a comprising it, is adapted to absorb the full dynamic force of the fluid acting on it and reverse the fluid with its force substantally undiminished to further act upon subsequently positioned members within the circuit that are adapted to receive it. The housing member 16, 16a is enclosed by side members 17, 17a, thus forming a closed unit.

There are positioned within each circuit secondary members 20, 20a adjacent the first driven members 18, 18a bucket outlets. Each of the secondary members 20, 20a constitutes a reaction member. In each fluid circuit then, there is an impeller 14, 14a, a driven member 18, 18a and a secondary member or reaction member 20, 20a, respectively. Each circuit is defined by the torus sides of each member which form an enclosed path for the moving fluid, the path being curved in a gentle fashion by the members' construction.

The rotating driven member 16, 16a which comprises the adjacent annular driven members 18, 18a and to which are attached end disc members 17, 17a is therethrough mounted for rotation on sleeve bearings 22, 23. The sleeve bearing 22 is positioned on an inner sleeve 24 forming part of the secondary member 20 and which member is, in turn, mounted on a sleeve bearing 25 positioned on shaft 10. Likewise, on the other end of the converter, the housing sleeve bearing 23 is mounted on the secondary member's sleeve extension 29 rotating on sleeve bearing 23 which is positioned on the stub end of the input shaft 10.

Suitable means for preventing the escape of the working fluid from within the converter are provided. Such means may comprise flared ends 31 of the housing member, as at the forward end, containing a suitable packing material 32. The escape of the working fluid through the other end of the converter may be similarly prevented as will be hereinafter explained.

Each secondary member 20, 20a has mounted on its respective sleeve a unidirectional clutch of a suitable type. To the secondary member 20 and on its sleeve 24 there is mounted such a clutch as the one-way bearing clutch 34. As shown in Figures 1 and 10, on this clutch and forming a part thereof there is mounted a sleeve or cylinder 35 having an upwardly extended member 36. Member 36 at one end is adapted to receive a pin or stub shaft 37. Pivoting on the pin 37 is one end 38 of a link member 39. The other end 40 of link member 39 is pivoted on a pin 42 mounted within end 44 of a cam member 45. Link member 39 is, further, arcuately indented in its body portion, as shown in Figure 10, to partially accommodate the periphery of the sleeve 35 when thrown over to a bearing position against sleeve 35. The cam member 45 is rotatively mounted on one end of a rod 48 and abuts a supporting member 49 which is desirably fixed to some part of a support holding the converter unit. Rod 48 is adapted to be moved only in its longitudinal direction, being held against rotation by means of a slot 51 and key 53 therein. The key may be held by member 49. Instead of a slot and key combination, splines may be utilized. There is further provided a complementary cam 50 also mounted on rod 48 frictionally bearing against the face of cam 45. The cam 50 is locked to rod 48 by means of a pin 52 extending through both the cam and the rod. Since cam 45 abuts the support member 49, any movement of link 39 will cause a movement of cam 45 and of rod 48 in a longitudinal direction through the complementary cam 50.

Link 39 is moved, then, by the working fluid acting on the secondary member 20 which fluid force is transmitted to the link through the clutch 34. The operation of the described members is, thus, substantially dependent upon the secondary or reaction member 20. Further, the secondary member or reaction member 20 controls the position of rod 48 which, in turn, operates the associated transmission. The member 20, due to being mounted on a unidirectional clutch, is also permitted to freely rotate or "idle" in the event of a "negative" fluid pressure, that is, when the driven member absorbs the full fluid force.

The secondary member 20a in the adjacent fluid circuit is also attached to a unidirectional clutch 52 in somewhat the same manner as the secondary member 20. The clutch 52 is mounted on the sleeve 29 of the secondary member 20a. On the clutch, which may be of the bearing type as shown in Figure 4, there is mounted a pinion gear 68 which is adapted to mesh with a planet gear of a gear cluster of the transmission unit that is attached to the rotating housing member 16, 16a. The transmission unit through gears 68 and 63 is adapted to hold the member as a reaction member when the unit is a torque converter and the clutch 52 serves as a means for making a firm connection of the transmission to the member 20a in such event. The clutch also locks the member 20a to the output shaft of the unit when the shaft rotates faster than the input shaft, as will be hereinafter explained.

In view of the fact that the torque output is adapted to vary in accordance with the quantity and velocity of the working fluid delivered to the driven members, it is desirable to control the mass or the velocity of the flowing fluid in such a way so as to substantially always provide a force on the driven members 16, 16a in accordance with load conditions over a substantial range. There is provided by this invention a control of the fluid mass, also its velocity, and which control is the function of a novel impeller.

The impeller 14, 14a is an adjustable one, being adapted to vary the moment or lever arm of the fluid mass and thus the torques. The output blades of the impeller are desirably positioned in accordance with torque requirements as expressed by the applied force of the working fluid against the impeller blades. The input blades are fixed and act as guide blades. Thus, when a high torque is called for due to a heavy load a greater mass of fluid is desirably transmitted but at a lesser radius of the impeller blades than for a low torque as when the unit is a coupling. By adjusting the length, then, of the output blades of the impeller, the mass, head or velocity of the fluid can be varied. Since the quantity flow of the working fluid is greater at high torques than at low torques, the force applied to the driven member is greater. However, for increasing speed a lesser fluid mass is required but the fluid velocity or head must be increased. Then by extending the impeller output blades, the mass is decreased while its head is increased and the fluid velocity is likewise increased. Such a control can be effective substantially throughout the torque range since a change in the output blade diameters effects a change in the moment arms to the driven members or in the lever arms and, therefore, in the torques.

The impellers 14, 14a of Figure 1 have entry or guide blades 54, 54a which may be of the propeller type, although other types may be utilized, and adjustable fluid output blades 56, 56a as shown in Figures 5, 6 and 7. The impeller outlet blades 56, 56a may be straight, as shown, or they may be desirably curved. Impeller 14 of the first fluid circuit comprises the entry blades 54 and adjustable exit blades 56. The entry blades are, in effect, divorced from the output blades. The impeller 14 is mounted on a sleeve 60 which is adapted to move within limits on a sleeve 64 which is splined with shaft 10. The entry section 54 of the impeller 14 is then adapted to move angularly laterally but not the adjustable output blades 56, as will be hereinafter explained. The amount of movement of the impeller containing section 54 is determined by the angularity of a guideway 61 in the sleeve 60 within which a pin 62 moves, as shown in Figures 2 and 3. Pin 62 is part of the sleeve 64 which is splined with the shaft 10. The impeller 14, including section 54, will be positioned nearer the secondary member 20 when the impeller is under load and away therefrom when it is under light load or no load. This is so in view of the rotation of the impeller by the shaft 10, which rotation is normally to the right when facing the prime mover which operates the converter. Thus, when a load is impressed on the impeller output blades 56, entry blades 54 will be caused to move slightly toward the secondary member 20.

As stated hereinbefore, the impellers are enshrouded in order to form fluid guide channels or paths. In addition to the path-forming shrouds or sides 57, 57a, additional coverings or enclosures 58, 58a are provided to keep fluid from possible pocketing under the buckets 18, 18a. The covering further extends at the top to the torus or shroud walls 57, 57a partially enclosing the output blades 20, 20a.

The section 54a of the impeller 14a of the adjacent circuit is not divided as impeller 14 and it is not so adapted to be moved. The impeller 14a including entry blades 54a and output blades 56a is fixed against lateral or axial movement, being rigidly mounted on the sleeves 60 and 65a. The sleeve 60 is also interlocked with sleeve 65 by means of complementary recesses 66 and projections 67 and which recesses permit the longitudinal movement of the projections therein and of the impeller section including blades 54.

Substantially intermediate the splined sleeve 64 there extends radially thereof a flange 70. The flange may be an integral part of the sleeve 64. On each side of the flange 70 and between the impeller 14, 14a sides there are positioned discs 73, 73a having guideways 74, 74a, as shown in Figures 5, 6 and 7. Pins 71, 71a which are attached to the movable output blades 56, 56a are adapted to move in the guideways 74, 74a. The guideways in the discs 73, 73a are cut in such manner so as to make the blades movable thereby over predetermined load ranges applied to the movable blades. A sufficient force acting on the movable blades will tend to move them in the direction of the force being applied, thus causing them to move in a substantially radial plane. In the illustration, the blades are forced to the left (the rotation being to the right). As the blades are forced to the left, they are simultaneously forced downwardly by the rotation of the discs 73, 73a. This rotation is resisted by coiled compression springs 75, 75a having one set of ends fixed in the discs 73, 73a and the other set of ends in the splined sleeves 65, 65a. The yielding points of the springs are based on predetermined loads on the adjustable blades.

When the unit is not in operation or when it is a coupling, the adjustable blades 56, 56a are normally fully extended inasmuch as they are under a partial load. When, however, a force is applied against them, the blades are forced back through the moving pins 71, 71a in the guideways 74, 74a whose angularity and the resiliency of the compression springs 75, 75a cause the discs 73, 73a to rotate and to thus draw the blades 56, 56a radially downwardly. Desirably, blades 56 are not retracted as rapidly as blades 56a inasmuch as it is preferable that velocity of the fluid in that circuit be immediately increased in order to actuate locking member 39, since the increase in velocity will cause member 20 to become locked. When the adjustable blades 56 also are retracted, the impeller 14, 14a is enabled to drive a greater volume of working fluid into the driven members' buckets 18, 18a. The outlet blades of the impeller 14, 14a by their readjustment of the length or their diameters in accordance with load will accordingly vary the volume and the head of the working fluid. The movement of the adjustable blade sections 56, 56a may be desirably in guideways or slots cut through a portion of the entry blades and in the shroud forming the outer torus walls.

As hereinbefore stated, no portion of the impeller 14a of the adjacent circuit will move laterally for it is desirably fixed against such movement. However, the adjustable blades 56a are desirably first more fully responsive to fluid pressures on them than the adjustable blades 56 inasmuch as the guideways 74a in disc 73a will cause the adjustable blades to substantially immediately retract to increase the torque to the output shaft. The guideways 74 for the adjustable blades 56 will first describe an arc which has substantially the same radius for its entire length. This arcuate guideway desirably slows the drop of the adjustable blades 56, which delay permits a substantially immediate increase in the velocity of the fluid in this circuit and as a result a corresponding and immediate locking of the member 20. The locking of the secondary member 20 then effects a change-over of the unit from a coupling to a converter. The secondary member 20a, meanwhile, becomes substantially immediately locked to the transmission inasmuch as the transmission is substantially stationary. The member will rotate only at the rate of rotation of the transmission which locks it.

As stated, the increase in velocity of the fluid in the first fluid circuit will cause the secondary member 20 to lock and thus to become a reaction member, also to simultaneously cause a change in the selection of gearing in the transmission due to the change-over from a coupling to a converter. The adjustable blades 56 of the impeller 14 are withdrawn until they reach a point dictated by the imposed load. The secondary member 20 remains locked as initially will secondary member 20a until the transmission attains substantially the speed of the first driven member. The impellers of each circuit by decreasing their output blade diameters effect a movement of a greater mass of the fluid with less head and velocity immediately substantially increasing torque output.

The increase in velocity in the first circuit is effected by maintaining the output blades 56 in their extended position temporarily and a decreased area through which the fluid must flow to the driven member. The increase in the load on the input shaft 10 will cause the impeller section 14, including the entry or guide blades 54, to move toward the secondary driven member 20. A similar decrease in the load will, of course, force the impeller back to its first position. The movement of the forward section 54 of the impeller 14, due to its being enshrouded by enclosure wall 58 will tend to open or make more narrow the fluid channel from the impeller to the first driven member 16. The fluid channel formed by the inner and outer sides or enclosing shroud members is constant; however, it is movable relative the bucket entrances. Then a movement laterally of the impeller will move the fluid channel relative the entrances to the reversing buckets of the driven member 18 effecting a change in the outlet openings of the discharging impeller. However, this condition is temporary and the output blades are radially withdrawn, the impeller moving toward the secondary reaction member 20. When the impeller is positioned nearer the secondary member, the impeller fluid channel outlets are fully open to the bucket inlets permitting a transmission of a maximum quantity of fluid. Should the torque requirement decrease, the impeller will move back and outlets of the impeller will be diminished with the result that less fluid flows into the buckets but at increased velocities and heads.

There is no such movement of impeller 14a in the adjacent circuit. There, the retractable blades 56a are only movable being responsive substantially immediately upon a change in load. By means, then, of the adjustable blades the torque can be varied for the radius of the impeller can be varied. Thus, the shorter the output blade diameter then the longer becomes the moment arm and therefore the lever arm, to the driven member, and therefore a corresponding increase in torque.

To one end of the rotating primary member 16, 16a there is affixed as by means of bolts 77, the end plate 17a to which is attached a housing 78 accommodating a planetary gear system with a plurality of planetary gear clusters being usually employed. Gear cluster shafts 79 may be journaled at one end in a bearing in an extended portion 80 of the housing 78 and the other end may be journaled in a boss 82 on the disc end plate 17a. A gear cluster may be desirably comprised of gears 83, 84, 85 and 86. Gear 83 will mesh with a sun gear 88 which is mounted on and which forms a part of the one-way clutch 52. Gear 84 will mesh with a sun gear 89 which is fixed on a power-transmitting shaft 92 that is juxtaposed and aligned with the power input shaft 10. Planet gear 85 will mesh with sun gear 90 which is fixedly mounted on a sleeve 94. Planet gear 86 will mesh with sun gear 91 and is fixedly mounted on a sleeve 95 which is adapted to rotate about a sleeve 94. The other end of sleeve 94 carries a brake drum 96. A brake drum 97 is fixed to the other end of sleeve 95. Cooperating with brake drums 96, 97 are brake bands 98, 99, respectively.

The sleeves 94, 95 and the housing sleeve 93 are desirably flared at one of their ends so as to receive a packing material 32 that is adapted to prevent the leakage of the lubricant from the housing 78. The packing and a packing retaining means may be of any desirable type so long as they serve the purpose of an effective seal.

A suitable clutch such as a cone clutch 100 or any other type is slidably mounted for a limited lateral or axial movement on the power-transmitting shaft 92 and is adapted to rotate therewith. The contacting surface 100 of the cone clutch bears against a cooperating receiving cone surface 101 which is mounted interiorly of the brake drum 96. The clutch 100 is adapted to be moved into and from its contacting position with surface 101 by means of a lever 103 pivoted at some position between its ends on a pin 104. The pin 104 is positioned in a member 102 which may be rigidly fixed in any desirable manner to the frame work. The lever 103 has at the shaft end a yoke 105 which fits about the cone clutch sleeve 106 on the shaft 92. The yoke bears against a bearing 107 and nut 108 turned against the bearing. The cone clutch 100 is backed by a compression spring 109 which bears against the nut 108 and a collar 110 held on the shaft 92 by means of a setscrew 111 threaded through the collar and forced to bear against the shaft. Thus, a movement of the arm or lever 103 against the spring 109 will release the cone clutch 100 from its locking or contacting position with face 101. Normally, the compression spring 109 continually maintains the cooperating parts of the cone clutch in full contact.

The other end of lever 103 carries two pins 112, 113. Pin 113 serves as a connecting and pivoting point for a rod 114. Rod 114 is pivotally held at its other end by a pin 115. The pin 115 is positioned in a brake member 116. The rod 114 has slots or elongated eyes 117, 118, and 119. Pin 113 is in slot 117 and pin 115 is in slot 119. Slot 118 is substantially adjacent slot 117. In the slot 118 are two pins 121 and 122.

The pins 121 and 122 are positioned in pivoted members 130 and 125, respectively, which members are adapted to lock or unlock the braking devices 96 and 97. Member 124 operates a camming device relative to member 130 which actuates the braking of band 98 while member 125 operates the band brake 99. Further, brake member 116 is connected by means of a link 126 to bell crank or foot pedal 127 which also actuates the braking device 128 adapted to hold the housing 16, 16a from rotation. The means utilized to close or open the braking device 128 may be of any type of locking and unlocking device, as its only requirement is to lock and unlock the surface of the particular member upon which it acts.

The braking device 98, however, operates only when the unit is in a "neutral" position, that is, only when it is disconnected from the output shaft 92, otherwise, it is desirable to move the cam members without affecting a locking of the drum 96. There is, therefore, mounted on members 124 and 130 a pair of opposing cams 131, 132 having such cooperating surfaces, as shown in Figure 11, which will lock drum 96, permit either one of the two cam surfaces to continue its movement relative the other cam surface and permit the members to be moved without affecting their relative positions. In "neutral" the band 98 is kept open since the cams do not effect a locking of band 98, and the clutch 100 is out of contact with cooperating surface 101. Also, band 99 is kept open. The unit then is adapted to rotate independently of the output shaft.

The cams 131, 132 are shown in Figure 11. When either member 124 or 130 is actuated, as by rod 48 or rods 114, 146, and the other member being held one of the cams, depending upon their relative positions, will move over the face of the other and close or maintain open the band brake 98 about brake drum 96. Or, the members may be moved together without effecting any relative motion. The movement of the cams is resisted by a spring 134 which abuts washer 133 backed by a pin 135. For example, for the "neutral" position the hand lever 140 is moved, moving members 114 and 130 which latter is adapted to be moved relative the member 124 yet not lock the brake band 98. Neither is brake band 99 disturbed. For a reverse rotation of the output shaft, foot lever 151 is depressed and both members 124 and 130 are moved thus also not disturbing the cam positions inasmuch as band 98 is to be maintained in an open position, however, band 99 is closed. When the unit is a torque converter, then rod 48 actuates member 124 while member 130 is held causing a locking of the drum 96.

The member 130, which carries cam 132 operating relative to cam 131, is actuated by means of pin 121 in the slot 118 of the rod 114 which is connected to the foot pedal 127. The hand control comprises a hand lever 140 pivoting on pin 141 in a fixed support 142. A link 143 connects the hand lever 140 through pin 144 and to rod 114 by means of pin 145. The hand lever may be desirably held in its pulled or set position by some locking device as a ratchet. It, of course, must be held in order to determine the position of cam 132 on member 130, and to prevent any change in position of the rod 48 and the members depending upon it for positioning. Rod 114 can also be moved by means of the brake foot pedal 127 as well as by the hand lever 140 only, however, for the application of service brakes, when it is also desirable to disconnect the unit from the output shaft.

Brake arm member 125 which operates the braking band 99 of drum 97 is actuated by means of rod 148, linking the member 125 to a second foot control pedal or the "reverse" pedal 151 by means of pins 149 and 150 located at each end of the member 148.

Rod 48 is adapted to be moved longitudinally by the actuation of the cams 45, 50 mounted on one of its ends. The rod is pivotally connected by a pin 112 at its other end to the cone clutch operating lever 103. The rod 48 has a slot 138 through which the pin 112 passes. Somewhat in advance of the slot 138, the rod 48 carries a pin 139 adapted to actuate at certain times the member 124 which carries cam 131 and therethrough operating brake band 98 in the manner hereinbefore described. Thus, a movement of rod 48 will also lock or unlock brake drum 96 and withdraw the clutch member 100 from its holding position. Since, as has been hereinbefore explained, the movement of rod 48 is subject to a force applied to the secondary member 20, the operation of the brake band 98 is, then, responsive to the position of the secondary member as when it is a reaction member, as well as the operation of the cone clutch member 100. With little or no force acting on the secondary member 20, the cone clutch member 100 will remain closed unless the foot or hand controls are used.

Under normal conditions with the converter acting as a coupling, brake bands 98, 99 will remain open while the cone clutch will be closed. With the clutch 100 in a closed position, sun gear 99 on sleeve 94 is adapted to rotate with the transmitting shaft 92. Also, since sun gear 89 is mounted on the shaft 92 there occurs a locking action of the gear clusters to the transmitting shaft 92. Thus, the transmitting shaft 92 becomes direcly driven by the driven member 16, 16a. Under such direct drive conditions, sun gear 91 also rotates with the shaft since it is free to do so not being held by the band 99. Sun gear 88, in such circumstances, merely floats since it forms part of the unidirectional clutch 52.

By the way of an example, upon starting or when an increased load is placed on the converter herein described, the impeller 14, 14a of each circuit is caused to revolve with an increasing angular velocity and decreasing the diameter of its output blades to effect a greater flow of the working fluid through the reversing buckets 18, 18a forming the driven member 16, 16a. As a result of the increased load on the converter, the impeller section 54 of the first circuit moves toward the locked secondary or reaction member 20, the movement being limited by the guideway 61 in the impeller sleeve 60. Due to the increased impeller rotation, the fluid velocity is increased and substantially simultaneously the secondary member 20 assumes a position as a reaction member, and the retractable blades 56 start moving first arcuately then downward to the core of the impeller. The retractable blades 56a of the adjacent fluid circuit also are drawn in toward the core of the impeller in that circuit. Also, the secondary member 20a becomes locked by the transmission to assume a position of a reaction member in its circuit. The working fluid, meanwhile, is moved in a constantly increasing mass to the driven member 18, 18a of each circuit. The fluid acts on the buckets of the driven member while flowing therethrough in an unimpeded manner to also apply, in turn, a substantially similar undiminished force on the locked secondary members 20, 20a.

The secondary member 20, upon locking, causes a movement of cam 50 and therethrough of rod 48. Rod 48, in turn, moves lever 103 which disengages the cone clutch member 100. Simultaneously, cam member 124 is moved locking drum 96 against rotation. It will be noted that pin 113 will merely move in the slot 117 so no movement of the rod 114 occurs. Then with drum 96 being held, the planetary system is caused to revolve about the sun gear 90. The rotational motion of the system is then transmitted to the driven shaft 92 through sun gear 89 which is keyed to the shaft 92. The diameters of these gears desirably vary in order to give a required reduction ratio. During the load period, as has been hereinbefore described, the impeller blades 56a of the secondary circuit are first retracted and initially increase the volume of the fluid in that circuit. While in the first circuit, it is desirable to have a velocity increase so that an immediate pressure can be applied onto the secondary member to effect a change in the transmission.

When the load is overcome, the secondary members or reaction members 20, 20a are released to become free to assume a following position of the first driven member 16, 16a. The release of the secondary member 20 causes rod 48, lever 103 to move back to their normal positions because of the expansion of the compressed spring 109. The locked drum 96 is also released as well as the clutch member 100 which goes into a locking position with the surface of the receiving cone 101. As a result of the changes in position of the above elements, sun gear 90 which is mounted on the sleeve 94 becomes locked directly to the driven shaft 92 through the cone clutch.

The planetary system also becomes locked in a driving relation through the sun gears 89, 90 with driving shaft 92. Planet gear 83 which meshes with the clutch mounted gear 88 will freely rotate and gear 86 which meshes with sun gear 91 will freely rotate sleeve 95 and the unlocked drum 97. The converter will then become a coupling since there is no further demand for torque reductions and, as a result, a direct drive of shaft 92 occurs. The housing or driven member 16, 16a rotation during such times will approximate the rotation of the driven shaft.

It will be noted that both members 20 and 20a are utilized as reaction members. During dynamic braking, secondary member 20 serves essentially as a reaction member while member 20a is utilized as an impeller. The member 20a is brought into action as an impeller when the rotation of the driven shaft 92 becomes greater than the rotation of the converter. At such times, then, the unit may be utilized for dynamically braking the prime mover.

To dynamically brake the prime mover, the driven member 16, 16a is held fast so that the full reversing effect is had on the driven member and therethrough on the prime mover. The rotating housing 16, 16a is held by depressing the foot lever 127 sufficiently to close the braking band 128 on the braking surface on the housing but not setting the service brakes actuated by rod 155. The output shaft 92 through the sun gears 89, 90 and through sun gear 88 which is mounted on the one-way clutch 52 drives the secondary member 20a. Sun gear 86 because of the greater shaft rotation becomes locked on the clutch 52 locking sleeve 29 to which the member 20a is attached, thus driving member 29a. Member 20a, in turn, effects a reversal of the working fluid through the held driven member 16a against the impeller 14a. The reaction member 29 also becomes locked and desirably remains so during the braking interval to maintain full cooperation between the output shaft and the prime mover. The working fluid is thus directed by the held driven member against the more slowly rotating impeller blades and through the impeller against the prime mover to thus slow it down. Since the housing 16, 16a is held, the driven shaft 92 drives the secondary member 20a through the planet gears for the planet gear housing 78 itself is held, being attached to the driven member. Also, all other braking members are properly maintained open when the foot pedal 127 is actuated. Such dynamic braking is advantageous in that it is self-operating, and that it utilizes only the working fluid as a speed-restraining means on the prime mover.

This invention also advantageously provides for reversing the rotation of the driven shaft 92. This is accomplished by holding brake drum 97 to which is attached the sleeve 95 mounting sun gear 94. The planet gear cluster, as before, rotates in the same direction but due to the differences in diameters of planet gears 86 and 84, shaft 92 is caused to rotate in the reverse direction.

To effect the reversal of rotation of the shaft 92, foot pedal 151 is depressed causing link or rod 148 to move in a forward direction moving brake member 125, and also positioning member 130 having cam 132 preventing the locking of drum 96. When member 125 moves, it also pulls forward member 130 which is positioned so that drum 96 is kept from being locked and also pulls lever 103 forward to disengage the cone clutch. Thus, the shaft 92 is released to rotate in a reverse direction.

Because of the slots in rod 114, selective movements of the various pin-containing members can be desirably effected. For stopping purposes, the unit can, of course, be entirely disconnected from the output shaft by fully depressing foot lever 127, and therethrough setting the service brakes through member 155. To place the vehicle containing the converter into neutral, the hand lever 140 is pulled, in turn pulling rod 143 which actuates member 130 and therethrough members dependent upon it, releasing drum 96 and the cone clutch, thus freeing the apparatus from the output shaft.

The apparatus for transmission of torque as described herein comprises two fluid working chambers. Two chambers are desirable in order that a sufficiency of working fluid may be had for all torque ratios and when the apparatus assumes a coupling status. Further, as has been shown, the second circuit provides for dynamic braking. Each circuit under certain conditions, then, has a separate function to perform and under others both circuits must be combined. Thus, for forward and reverse movement both circuits are utilized, the first circuit controlling the associated transmission while the second circuit provides for an additional reaction of the fluid; and for high speeds the necessary fluid volume is provided to avoid any substantial slippage when the unit is a coupling. The second circuit could feasibly be omitted for forward motion, however, the over-all performance may suffer as a result of its omission. However, for dynamic braking the secondary or reaction member of the second circuit is converted into an impeller and the secondary member of the first circuit becomes a reaction member, thus the secondary circuit then becomes a necessary adjunct to the first circuit.

I claim:

1. A fluid transmission of the character described having a power input and an output shaft comprising, a fluid impeller, a primary fluid driven member, a secondary fluid actuated member adapted to be held against rotation when a fluid force created by said impeller is applied thereto, means for holding said secondary member, planet gears of a planetary gear system attached to said primary driven member, sun gears for said planet gears, a torque transmitting shaft adapted to be driven by said sun gears, and means responsive to a movement of said secondary member adapted to hold one of said sun gears to provide reaction for the planet gears which are adapted to drive said torque transmitting shaft.

2. A fluid transmission of the character described having a power input and an output shaft comprising, a fluid circuit, a fluid impeller in said circuit adapted to vary the fluid head within said transmission in accordance with torque requirements, a rotatable housing member defining an annular fluid driven member adapted to receive and reverse the fluid of said circuit, a reaction member in said circuit, means for locking said reaction member when a fluid force is applied thereto, planet gears of a planetary system attached to said rotatable driven housing member, sun gears for said planet gears, a torque transmitting shaft adapted to be driven by said sun gears, and means responsive to a reverse movement of said reaction member adapted to hold one of said sun gears to drive said torque transmitting shaft by said rotatable housing member and said planet gears.

3. A fluid transmission of the character described having a power input and an output shaft comprising, a fluid impeller adapted to vary the fluid head in said transmission in accordance with torque requirements, means for driving said impeller, a rotatable housing member defining an annular driven member comprised of a plurality of circumferentially substantially inwardly facing superposed fluid reversing passages, a reaction member, means responsive to force on said reaction member adapted to hold said reaction member against rotation, planet gears of varying diameter rotatably attached to said rotatable housing member, complementary varying diameter sun gears for said planet gears, one of said sun gears being fixed to said output shaft and the remaining sun gears being rotatably positioned about the output shaft, and means for holding said rotatably positioned sun gears to provide reaction for the planet gears which drive the fixed sun gear on said output shaft.

4. A torque converter utilizing a fluid as a working medium comprising, at least two fluid working circuits, a fluid impeller having movable output blades in each circuit adapted to vary the fluid head in each of said circuits by radially moving its output blades, said blades being in retracted position when under increased torque requirements and in extended position when under decreased torque requirements, means for driving said impellers, a rotatable member defining an annular fluid driven member for each of said circuits comprised of an annularly adjacent plurality of circumferentially inwardly facing superimposed fluid receiving and reversing passages, secondary members in each of said circuits and means for holding said secondary members as reaction members, said holding means being a unidirectional brake.

5. A torque converter comprising at least two fluid working circuits, a fluid impeller in each circuit adapted to vary the fluid head therein, said impellers having adjustable output blades, means responsive to fluid reaction on said impellers being adapted to position said adjustable blades, said means comprising rotating discs having angular guideways, pins on said adjustable blades positioned in said guideways and adapted to be moved when said discs rotate, a resilient means for resisting the rotation of said discs, guideways in said impellers for said adjustable blades, means for axially moving one of said impellers to adjust the fluid flow path of its circuit when said impeller output blades are adjusted, a rotatable member actuated by said working fluid defining joined adjacent annular fluid driven members comprised of a plurality of circumferentially inwardly facing superposed fluid receiving and reversing passages, secondary members, said secondary members being adapted to act as reaction members, unidirectional locking means attached to one of said secondary members, said locking means being responsive to fluid pressures on said secondary member, planetary gears rotatably attached to said rotatable working member, sun gears for said planetary gears, the first of said sun gears being mounted on a one-way clutch joined with the other of said secondary members for holding the said secondary member as a reaction member, an output shaft having a second sun gear, a clutch for connecting said output shaft with the third of said sun gears, means responsive to a reversing movement of one of said reaction members adapted to connect said clutch joining said output shaft to said third sun gear, a fourth sun gear for effecting reverse rotation of said output shaft, and means for holding the third and fourth sun gears from rotation.

6. A torque converter comprising at least two fluid working circuits and having a power input and an output shaft, a fluid impeller in each circuit, a driven member defining at least two annular driven members, one for each of said circuits, a secondary member in each circuit, one of said secondary members being oppositely rotating relative to said driven member, sleeves attached to said secondary members, unidirectional means attached to said sleeves for holding said secondary members from rotation, means cooperating with one of said unidirectional means being adapted to hold said secondary member as a reaction member, a sun gear mounted on the other of said unidirectional means, planet gears rotatably attached to said driven members in meshing relation with said sun gear, and said planet gears by being attached to said driven member are adapted to hold said other secondary member as a reaction member as long as there exists a differential in the speed of rotation between the driven member and the planet gears.

7. A fluid transmission having a power input and an output shaft, comprising: a fluid impeller positioned in a fluid circuit adapted to vary the head of the fluid in accordance with torque requirements, a primary fluid driven member comprising a plurality of circumferentially positioned inwardly facing fluid reversing passages, a secondary fluid actuated member, said secondary member being a reaction member and being reversely movable relative to said primary driven member, torque transmitting means rotatably attached to said primary driven member, said output shaft being driven by said torque transmitting means, a clutch between said output shaft and said torque transmitting means, and means responsive to movement of said reaction member in an opposite direction to said primary fluid driven member controlling said clutch and therethrough the joining of said output shaft with said torque transmitting means.

8. A fluid transmission having a power input and an output shaft comprising: a fluid impeller adapted to vary the head of a working fluid in accordance with torque requirements driven by said input shaft, a rotatable housing member defining an annular fluid driven primary rotor comprised of a plurality of circumferentially superposed substantially inwardly facing fluid receiving and reversing passages positioned at a receiving angle substantially equivalent to the tangential flow of fluid from the impeller, a reversely movable reaction member positioned adjacent the primary rotor receiving the reversed fluid from said primary rotor, holding means for said reaction member, torque transmitting means rotatably attached to said rotatable housing, drivingly joined complementary elements to said torque transmitting means for driving the fluid transmission output shaft, means for holding at least one of said drivingly joined complementary elements to provide reaction for the torque transmitting means, and means responsive to a reversing movement of the reaction member controlling said holding means adapted to drivingly connect the complementary elements to said output shaft.

9. A torque converter comprising, a rotatable housing enclosing two fluid circuits, a primary driven member in each of said fluid circuits in said housing and rotating therewith, fluid impellers in said housing for actuating said driven members, secondary members in said housing being adapted to act as reaction members, a power input shaft for driving said impellers, an output shaft, a transmission comprising a planetary gear system, one of said secondary members being joined with said transmission through a unidirectional holding means, planet gears of said planetary system attached to said driven member for rotation therewith, sun gears of said planetary system positioned about said output shaft, one of said sun gears being fixed to said output shaft and another of said sun gears being mounted about said unidirectional holding means of said secondary reaction member, means for holding said primary driven members from rotation, and said held primary driven members becoming reaction members when said output shaft rotates at a greater rate than said impellers, said unidirectional means joining said reaction member to said transmission driving said secondary reaction member reversely through said transmission reversing the direction of flow of the fluid against said impellers.

10. A fluid transmission comprising, a power input shaft, two fluid circuits, each fluid circuit having an impeller driven by said power input shaft, a common driven member having fixed thereto a rotor in each of said fluid circuits, a second fluid actuated member in each of said circuits, said second fluid actuated members being adapted to act as reaction members, a transmission attached to said common driven member, a clutch, an output shaft, means responsive to a movement of one of said reaction members when said reaction member is subjected to fluid reaction being adapted to join said transmission through said clutch to said output shaft, said reaction member movement responsive means being operative when torque output is required and means for connecting said other of said reaction members to said transmission, said means being responsive to an overrunning of said output shaft, said second reaction member being idle during torque output and being joined to said transmission during overrunning of said output shaft.

11. A fluid power transmission comprising, a power input shaft, two fluid circuits, each fluid circuit having an impeller, a driven member, and a second fluid actuated member, said driven members forming a common driving unit, said impellers being fixed to said input shaft so that both are simultaneously driven, a transmission attached to said common driven unit, an output shaft, said output shaft being driven by said transmission, means for providing reaction for said transmission, and means responsive to the movement of one of said reaction members in a direction reverse to said driven unit controlling said reaction providing means.

12. A fluid working apparatus for transmitting torque comprising, a fluid circuit, a fluid impeller in said circuit mounted about a shaft for rotation therewith having axially movable fluid input blades and radially adjustable output blades, means responsive to the reaction of the circuit fluid on the said impeller movable inlet and output blades adapted to move said blades, a first driven rotatable member in said circuit being actuated by the fluid from said impeller, a second rotatable member in said fluid circuit adapted to receive the fluid from said first driven rotatable member then redirecting said fluid to said input portion of said impeller, said impeller input blades being axially movable in said fluid circuit toward the outlet section of said second member and said output blades being radially adjustably withdrawn from a normal extended position toward the axis of rotation by said means when said impeller input and output blades are subjected to the reactive force of the circuit fluid.

13. A fluid working apparatus for transmitting torque comprising, at least two fluid circuits, a fluid impeller in one of said circuits having axially movable intake blades and radially adjustable output blades, means responsive to the reaction of the circuit fluid on the said impeller input and output blades adapted to move said blades, an impeller in said other fluid circuit having fixed input blades and radially adjustable output blades, means responsive to the reaction of the fluid of said other circuit on the said output blades adapted to move said blades, means for limiting the axial movement of said first impeller intake blades, means for limting the movement of the output blades of both said impellers, first driven members in said circuits receiving the fluid from said impellers, and reaction members in said circuits being responsive to the reaction of the fluid discharged from said first driven members.

14. A torque converter utilizing a fluid as a working medium comprising, a fluid impeller having movable output blades adapted to vary the fluid head in said converter by radially adjusting its output blades in accordance with torque requirements, said blades being in retracted position when under increased torque requirements and in extended position when under decreased torque requirements, means for driving said impeller, a rotor actuated by said working fluid defining an annular fluid driven member comprised of a plurality of circumferentially superposed substantially inwardly facing fluid receiving and reversing passages, a reaction member, means responsive to pressure of the working fluid applied on said reaction member adapted to lock said reaction member against rotation, a plurality of planet gears mounted on a shaft rotatably attached to said rotor, sun gears for said planet gears, a torque transmitting shaft adapted to be driven by said sun gears, sleeves about said torque transmitting shaft for mounting said sun gears, holding means for at least one of said sleeves and means responsive to the action of the reaction member locking means controlling said holding means and at least one sun gear against rotation to provide reaction for at least one of the planet gears.

15. A torque converter having at least two fluid working circuits comprising, a fluid impeller in each of said circuits adapted to vary the fluid head therein, each of said impellers having adjustable output blades and one of said impellers having an adjustable fluid inlet portion, means responsive to the varying fluid reaction in each circuit positioning said adjustable outlet blades, means responsive to varying fluid reaction in one of said circuits for moving the fluid inlet portion of one of said impellers axially in the fluid flow path of its circuit, a rotatable member comprising joined spaced rotors each positioned in a fluid circuit, said rotors being formed of a plurality of circumferentially spaced inwardly facing fluid receiving passages having inlets and outlets positioned in lines substantially parallel to the axis of rotation of the spaced rotors, secondary members in said fluid circuits positioned adjacent the passage outlets of said rotors, and means for holding said secondary members as reaction members.

16. In a fluid transmission having an impeller and at least one driven member, a fluid circuit, said fluid impeller in said fluid circuit having movable inlet and outlet blades, said impeller inlet blades being automatically axially movable, and said outlet blades being automatically radially extensible varying the diameter of the impeller, means responsive to the reactive forces of the transmission fluid on the input and outlet blades of the impeller adapted to move said blades.

17. A torque converter utilizing a fluid as a working medium comprising, a fluid impeller having movable output blades adapted to vary the fluid head in the converter in accordance with torque requirements, said fluid head being varied by radially moving the output blades, the output blades being in retracted position when under increased torque requirements and in extended position when under decreased torque requirements, means for driving said impeller, a rotatable member actuated by said working fluid defining an annular fluid driven member comprising a plurality of circumferentially substantially inwardly facing superposed fluid receiving and reversing passages, a reaction member, means for locking said reaction member against rotation, a plurality of planet gears of a planetary system mounted on a shaft rotatably attached to said housing number, sun gears for said planet gears, a torque transmitting shaft mounting one of said sun gears, sleeves about said shaft mounting the other of said sun gears, means on said sleeves adapted to prevent their rotation, cooperating holding means for holding said means on the sleeves, and means actuated by said reaction member controlling said holding means.

18. A torque converter utilizing a fluid as a working medium comprising, a fluid impeller adapted to vary the fluid head in the converter in accordance with torque requirements, said fluid head being varied by radially moving the output blades, the output blades being in retracted position when under increased torque requirements and in extended position when under decreased torque requirements, means for driving said impeller, a rotatable member actuated by said working fluid defining an annular fluid driven member comprising a plurality of circumferentially substantially inwardly facing superposed fluid receiving and reversing passages, a reaction member, means for locking said reaction member, a plurality of planet gears of a planetary system mounted on a shaft rotatably attached to said rotatable member, sun gears for said planet gears, a torque transmitting shaft mounting one of said sun gears, sleeves about said shaft mounting the other of said sun gears, means on said sleeves adapted to prevent their rotation, holding means for said sleeve means adapted to selectively hold said sleeves, and said selective holding means being actuated by said reaction member.

19. A torque converter utilizing a fluid as a working medium comprising, a fluid impeller adapted to vary the fluid head in the converter in accordance with torque requirements, said fluid head varied by radially moving the output blades, the output blades being in retracted position when under increased torque requirements and in extended position when under decreased torque requirements, means for driving said impeller, a rotatable member actuated by said working fluid defining an annular fluid driven member comprising a plurality of circumferentially substantially inwardly facing superposed fluid receiving and reversing passages, a reaction member, means for locking said reaction member, a transmission, a plurality of planet gears of a planetary system in said transmission being mounted on a shaft rotatably attached to said rotatable member, sun gears for said planet gears, a torque transmitting shaft mounting one of said sun gears, sleeves about said shaft mounting the other of said sun gears, holding means for said sleeves adapted to prevent their rotation, means cooperating with said holding means for selectively controlling said holding means, said selective means being responsive to the fluid reaction on said reaction member or to manual control, a clutching device adapted to connect said transmitting shaft with said planetary system, said clutching device cooperating with said selective means.

20. A fluid transmission comprising, a power input shaft, an output shaft, spaced impellers fixed to said input shaft positioned in adjacent separate fluid circuits, spaced primary driven members in said fluid circuit each being positioned adjacent said impellers and both being joined to form a unitary combined driven member, a first and second reaction member in each fluid circuit adjacent said primary driven members each being independently actuated, a planetary system attached to said unitary combined driven member, said planetary system having a planet gear cluster of gears of varying diameters, complementary meshing sun gears of varying diameters, one of said sun gears being fixed to said output shaft and two other sun gears being mounted on separate sleeves positioned about said output shaft, one of said sun gears being fixed to one of said sleeves, a unidirectional brake joining a fourth sun gear to said second reaction member, a unidirectional brake about one of said sleeves having mounted thereon one of said sleeve mounted sun gears, a holding means for said other sleeve having a fixed sun gear, said holding means having a clutch for connecting said other sleeve to the output shaft, means responsive to movement of the first reaction member in a reverse direction to the primary driven members controlling the said sleeve holding means, and the clutch being adapted to join the said sleeve to the output shaft, a second holding means for said second sleeve, said second holding means upon actuation making said first holding means inoperative and locking said unidirectional mounted sun gear to said second sleeve to drive said shaft mounted sun gear, and said shaft mounted sun gear when rotating at a greater rate than its complementary planet gear locking said unidirectional brake connecting the second reaction member to the said fourth sun gear to drive said second reaction member.

21. A fluid transmission comprising, a fluid impeller, a fluid driven member, a reaction member positioned adjacent to said fluid driven member and being actuable by the fluid leaving said driven member, and said impeller having movable inlet blades and radially adjustable outlet blades, said inlet blades being movable axially toward the reaction member and the said outlet blades being movable radially to the axis of the impeller varying the diameter thereof, the movement of the said inlet blades and the outlet blades of said impeller being automatic in accordance with fluid reactive forces.

STANLEY MAYNER.

REFERENCES CITED

The following references are of record in the file of this patent:

UNITED STATES PATENTS

| Number | Name | Date |
|---|---|---|
| 1,900,120 | Lysholm | Mar. 7, 1933 |
| 1,940,918 | Petroni et al. | Dec. 26, 1933 |
| 2,078,597 | Beaumont | Apr. 27, 1937 |
| 2,145,006 | Fichtner | Jan. 24, 1939 |
| 2,190,830 | Dodge | Feb. 20, 1940 |
| 2,291,120 | Tipton | July 28, 1942 |
| 2,292,482 | Roche | Aug. 11, 1942 |
| 2,317,498 | Tipton | Apr. 27, 1943 |
| 2,351,516 | Jandasek | June 13, 1944 |
| 2,393,859 | Jandasek | Jan. 29, 1946 |
| 2,440,445 | Jandasek | Apr. 27, 1948 |